US012585132B2

(12) United States Patent
Lee et al.

(10) Patent No.: US 12,585,132 B2
(45) Date of Patent: Mar. 24, 2026

(54) OPTICAL FILM FOR CONTROLLING OPTICAL PATH, AND MANUFACTURING METHOD THEREFOR

(71) Applicant: SEKONIX CO., LTD., Dongducheon-si (KR)

(72) Inventors: Chan Hee Lee, Asan-si (KR); Jung Chul Seo, Hwaseong-si (KR); Jung Hoon Lee, Yeoju-si (KR); Jong Gil Kim, Buyeo-gun (KR)

(73) Assignee: SEKONIX CO., LTD., Dongducheon-si (KR)

( * ) Notice: Subject to any disclaimer, the term of this patent is extended or adjusted under 35 U.S.C. 154(b) by 251 days.

(21) Appl. No.: 18/282,953

(22) PCT Filed: Nov. 30, 2021

(86) PCT No.: PCT/KR2021/017906
§ 371 (c)(1),
(2) Date: Sep. 19, 2023

(87) PCT Pub. No.: WO2022/119281
PCT Pub. Date: Jun. 9, 2022

(65) Prior Publication Data
US 2024/0337854 A1 Oct. 10, 2024

(30) Foreign Application Priority Data

Dec. 3, 2020 (KR) ........................ 10-2020-0167347

(51) Int. Cl.
*G02B 27/09* (2006.01)
*G02B 5/00* (2006.01)

(52) U.S. Cl.
CPC ......... *G02B 27/0988* (2013.01); *G02B 5/003* (2013.01)

(58) Field of Classification Search
CPC ...... G02B 27/0988; G02B 5/003; G02B 5/22; G02B 5/30; G02B 26/08; G02B 5/3033
See application file for complete search history.

(56) References Cited

U.S. PATENT DOCUMENTS

2016/0103262 A1* 4/2016 Kashiwagi ........... G02B 6/0053
362/607
2023/0393312 A1* 12/2023 Kenney ................. G09F 21/049

FOREIGN PATENT DOCUMENTS

| | | |
|---|---|---|
| JP | WO 2011/055657 A1 | 3/2013 |
| KR | 10-2005-0063472 A | 6/2005 |
| KR | 10-2008-0050483 A | 6/2008 |
| KR | 10-2008-0089591 A | 10/2008 |
| KR | 10-2010-0019650 A | 2/2010 |

(Continued)

OTHER PUBLICATIONS

International Search Report for PCT/KR2021/017906 mailed Mar. 11, 2022 from Korean Intellectual Property Office.

(Continued)

*Primary Examiner* — Mariam Qureshi
(74) *Attorney, Agent, or Firm* — Paratus Law Group, PLLC

(57) ABSTRACT

An optical film for controlling an optical path, includes: a base film; an optical path control pattern part, which is formed on the base film and has a first refractive index; a light absorption pattern part, which is formed on the base film and has a second refractive index that is relatively smaller than the first refractive index.

16 Claims, 10 Drawing Sheets

INFORMATION LIGHT

100

200

300

(56)     References Cited

FOREIGN PATENT DOCUMENTS

| | | | |
|---|---|---|---|
| KR | 10-2012-0102588 | A | 9/2012 |
| KR | 10-2013-0016019 | A | 2/2013 |
| KR | 10-2017-0023165 | A | 3/2017 |
| KR | 10-2020-0019535 | A | 2/2020 |
| KR | 10-2020-0118647 | A | 10/2020 |
| WO | WO 2018/078493 | A2 | 5/2018 |

OTHER PUBLICATIONS

Korean Office Action for related KR Application No. 10-2020-0167347 mailed Aug. 23, 2022 from Korean Intellectual Property Office.
Korean Office Action for related KR Application No. 10-2020-0167347 mailed Feb. 16, 2023 from Korean Intellectual Property Office.

* cited by examiner

| OPTICAL PATH CONTROL PATTERN UNIT | | | LIGHT ABSORPTION PATTERN UNIT | REFRACTIVE INDEX OF OPTICAL PATH CONTROL PATTERN UNIT | REFRACTIVE INDEX OF LIGHT ABSORPTION PATTERN UNIT | TRANSMITTANCE (%) | SHIELDING ANGLE (°) |
|---|---|---|---|---|---|---|---|
| AR(Aspect Ratio) | Pattern Pitch (μm) | Pattern Height (μm) | | | | | |
| 5.00 | 10 | 30 | 4 | 1.52 | 1.46 | 59 | 25.0 |
| 2.73 | 15 | 30 | 4 | 1.52 | 1.46 | 73 | 32.5 |
| 1.88 | 20 | 30 | 4 | 1.52 | 1.46 | 80 | 425 |
| 1.43 | 25 | 30 | 4 | 1.52 | 1.46 | 83 | 57.5 |
| 1.15 | 30 | 30 | 4 | 1.52 | 1.46 | 86 | 77.5 |

OPTICAL FILM FOR CONTROLLING OPTICAL PATH, AND MANUFACTURING METHOD THEREFOR

CROSS-REFERENCE TO PRIOR APPLICATIONS

This application is a National Stage Patent Application of PCT International Application No. PCT/KR2021/017906 (filed on Nov. 30, 2021), which claims priority to Korean Patent Application No. 10-2020-0167347 (filed on Dec. 3, 2020), which are all hereby incorporated by reference in their entirety.

BACKGROUND

The present invention relates to an optical film for optical path control capable of accurately and efficiently recognizing information about an object.

Among many functions provided by an electronic device are those that use sensors. In particular, these sensors collect information related to the electronic device, the outside of the electronic device, or a user to provide information about whether the electronic device is operated, the situation around the electronic device, or the state of the user.

There are many types of sensors used in electronic devices, and recently, various services have been provided based on information collected using an optical sensor including a light emitting unit configured to generate light and a light receiving unit configured to detect light.

Conventionally, the electronic device is designed such that components of a sensor module, such as the light emitting unit and the light receiving unit, are stacked on an integrated element or such that the light receiving unit is disposed on a path along which information-reflected light (information light) can be received after light generated by the light emitting unit is absorbed or reflected by an object to be sensed.

With the recent trend of miniaturization and slimming of the electronic device, the optical sensor module including the light emitting unit and the light receiving unit must be disposed and designed in a very narrow space in the electronic device, and there may occur a problem in that the light generated by the light emitting unit is provided to the light receiving unit without reflecting the information of the object to be sensed due to the space constraint.

For example, light from the light emitting unit is provided directly to the light receiving unit without passing through the object to be sensed, light reflected from an internal structure of the electronic device is provided to the light receiving unit, or miscellaneous light from the outside is provided to the light receiving unit, resulting in reduced sensitivity of the sensor, operational errors, and provision of incorrect information to the user.

In addition, after light generated by the light emitting unit is reflected or absorbed by the internal structure of the electronic device, the remainder of the light may be provided to the light receiving unit, whereby the sensitivity and efficiency of the sensor may be reduced.

These problems may be becoming more common in small electronic devices that require a variety of elements to be mounted in a small space, such as recent small smart terminals.

Accordingly, there is a need for a technology capable of controlling the angle of information light such that information light reflecting information after light generated by the light emitting unit is provided to the object to be sensed can be efficiently incident on the light receiving unit, thereby preventing a decrease in efficiency of the light provided by the light emitting unit, and capable of controlling the angle of incident light on the light receiving unit such that information light reflecting distorted information is not provided to the light receiving unit.

SUMMARY

It is an object of the present invention to provide an optical film for optical path control configured such that pattern units having different refractive indices are formed on a base film to control an optical path, thereby supplying information-reflected light with high accuracy and efficiency, and a method of manufacturing the same.

In order to accomplish the above object, the present invention provides an optical film for optical path control, the optical film including a base film, an optical path control pattern unit formed on the base film, the optical path control pattern unit having a first refractive index, and a light absorption pattern unit formed on the base film, the light absorption pattern unit having a second refractive index less than the first refractive index.

In addition, the present invention provides a method of manufacturing an optical film for optical path control, the method including a first step of forming a base pattern on a substrate film through a patterning process, a second step of applying a first resin to the substrate film having the base pattern formed thereon, laminating a base film, and performing an imprinting process to form an optical path control pattern unit made of the first resin and having a first refractive index on the base film, and a third step of filling valley portions of patterns constituting the optical path control pattern unit with a second resin to form a light absorption pattern unit having a second refractive index less than the first refractive index on the base film together with the optical path control pattern unit.

The present invention has the effect of providing an optical film for optical path control capable of accurately and efficiently recognizing information about an object, wherein pattern units having different refractive indices are formed on a base film such that information-reflected light (information light) is supplied to a light receiving unit with high accuracy and efficiency.

That is, the present invention has the effect of forming patterns constituting a light absorption pattern unit between patterns constituting an optical path control pattern unit such that the incident path of information light to the light receiving unit is efficiently controlled based on the difference in refractive index between the optical path control pattern unit and the light absorption pattern unit and miscellaneous light is blocked by the light absorption pattern unit, whereby information light having more accurate information about the object is incident on the light receiving unit.

Furthermore, the optical film according to the present invention has the optical path control pattern unit and the light absorption pattern unit disposed between the patterns thereof, whereby it is possible to provide an optical film having an overall flat shape, and therefore it is possible to minimize the occurrence of defects during assembly and processing compared to an outwardly exposed shape of a conventional optical pattern while easily handling the optical film.

In addition, the light absorption pattern unit absorbs miscellaneous light from the outside, light reflected from an internal element or structure, etc. other than the information light to shield the internal structure, thereby supplementing an aesthetic function, while minimizing measurement errors in the light receiving unit.

BRIEF DESCRIPTION OF THE DRAWINGS

FIG. 7A shows specifications of optical path control pattern units and light absorption pattern units according to various embodiments of the present invention.

Figures 10A, 10B, 10C:
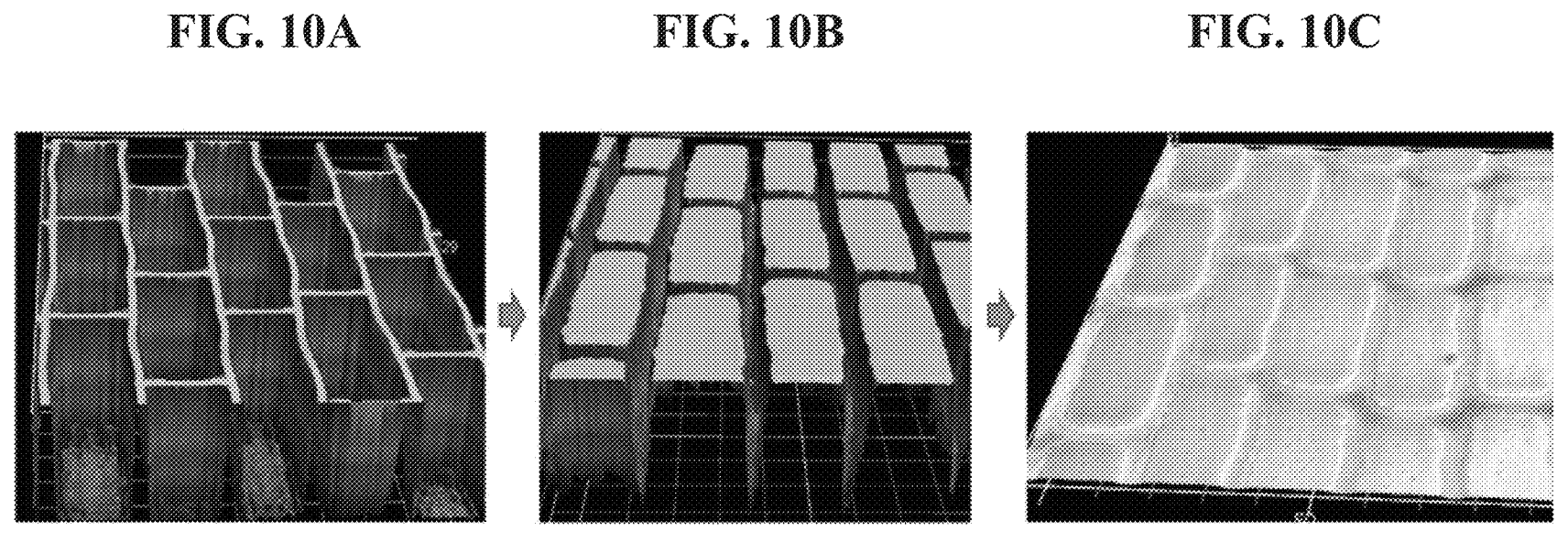

FIGS. 10A, 10B, and 10C show product images in respective steps of the manufacturing method according to the embodiment of the present invention. FIG. 10A shows the base pattern formed on the substrate film through the patterning process of the first step, FIG. 10B shows the optical path control pattern unit formed on the base film through the imprinting process of the second step, and FIG. 10C shows the light absorption pattern unit realized as the result of the valley portions of the optical path control pattern unit being filled with the second resin in the third step.

DETAILED DESCRIPTION

The present invention relates to an optical film for optical path control capable of accurately and efficiently recognizing information about an object, wherein pattern units having different refractive indices are formed on a base film such that information-reflected light (hereafter referred to as "information light" for convenience) is supplied to a light receiving unit with high accuracy and efficiency.

Figure 7B:
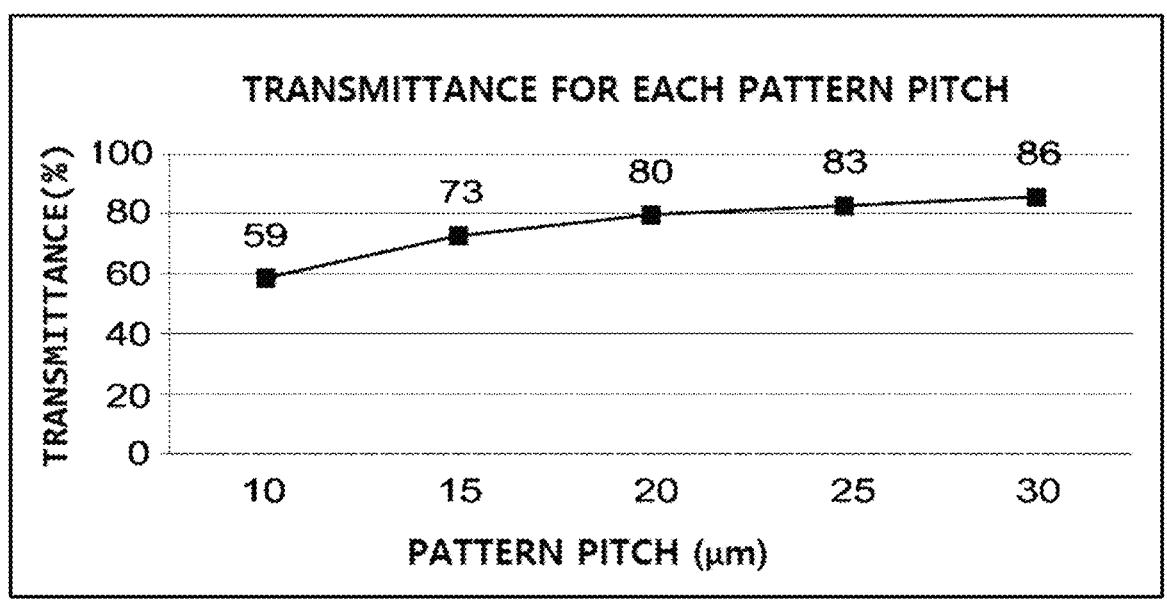
FIG. 7B shows data about transmittances based on the specifications.
Figure 7C:
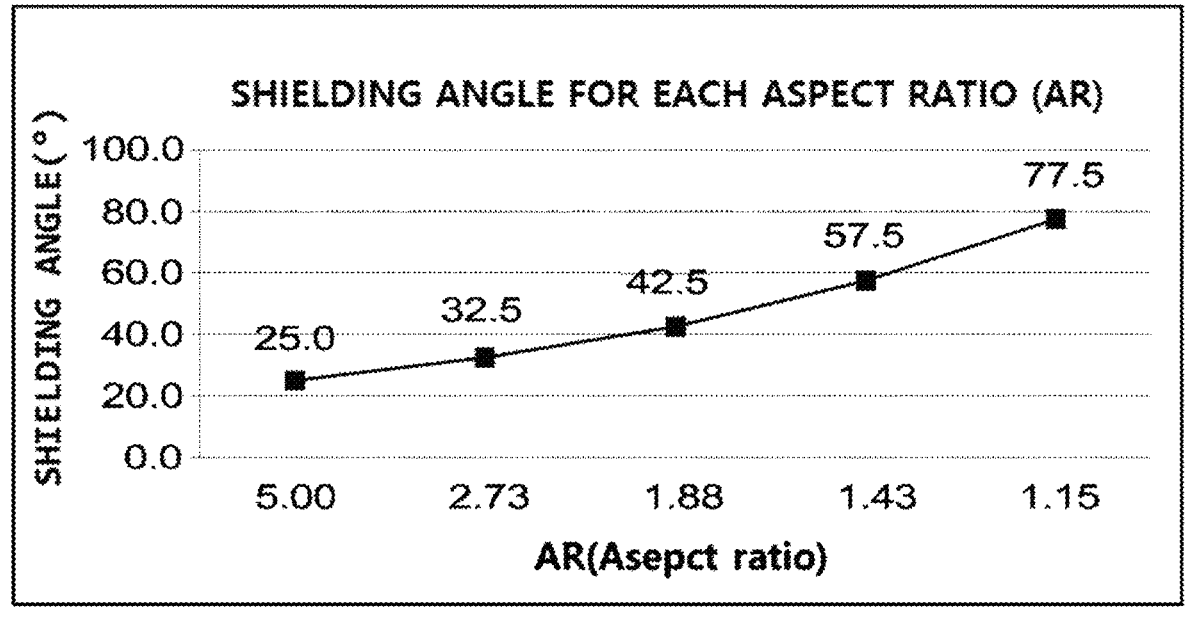
FIG. 7C shows shielding angles based on the specifications.
Figure 8:
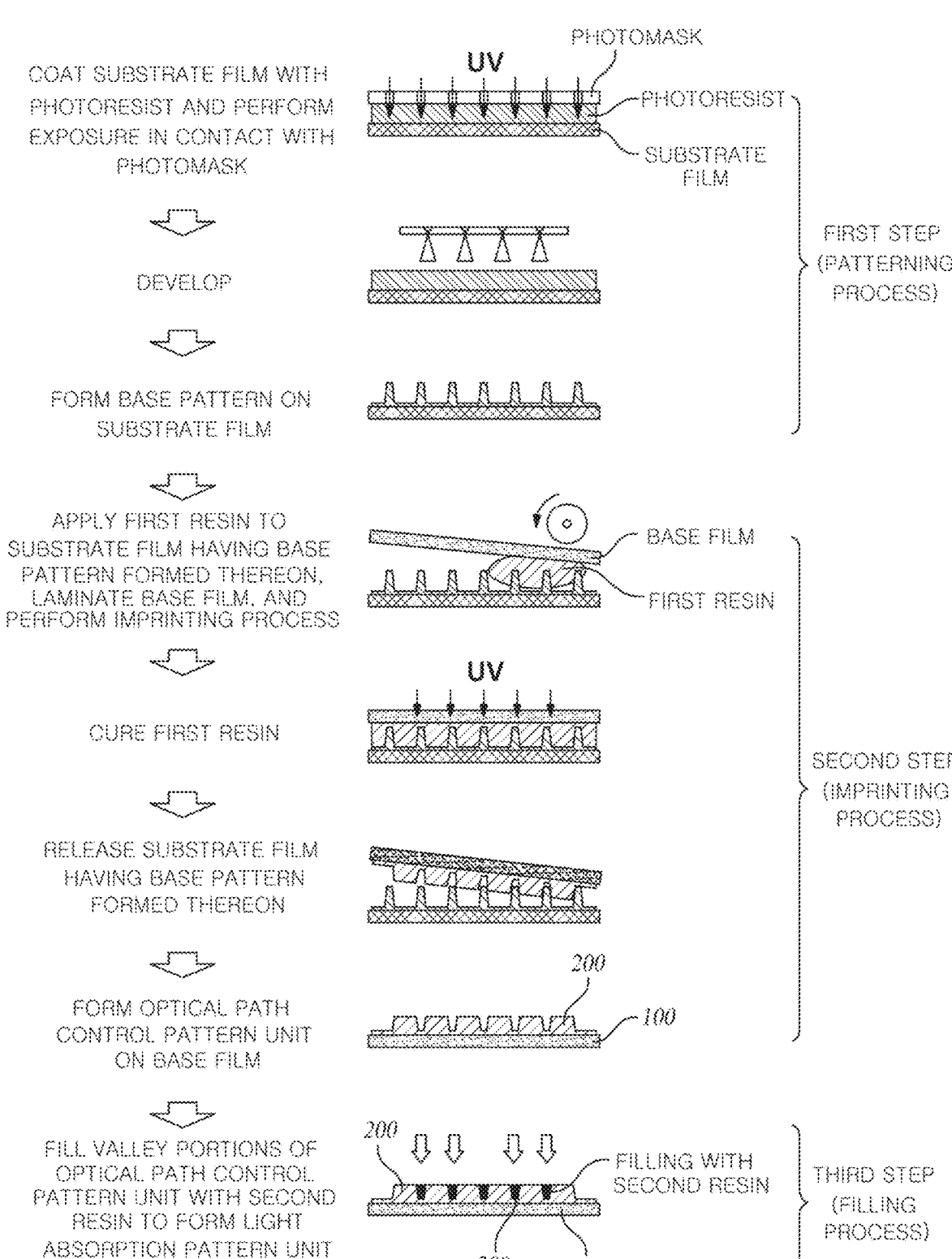
FIGS. 8, 9A, and 9B are schematic views showing a manufacturing method according to an embodiment of the present invention.
Figure 9A:
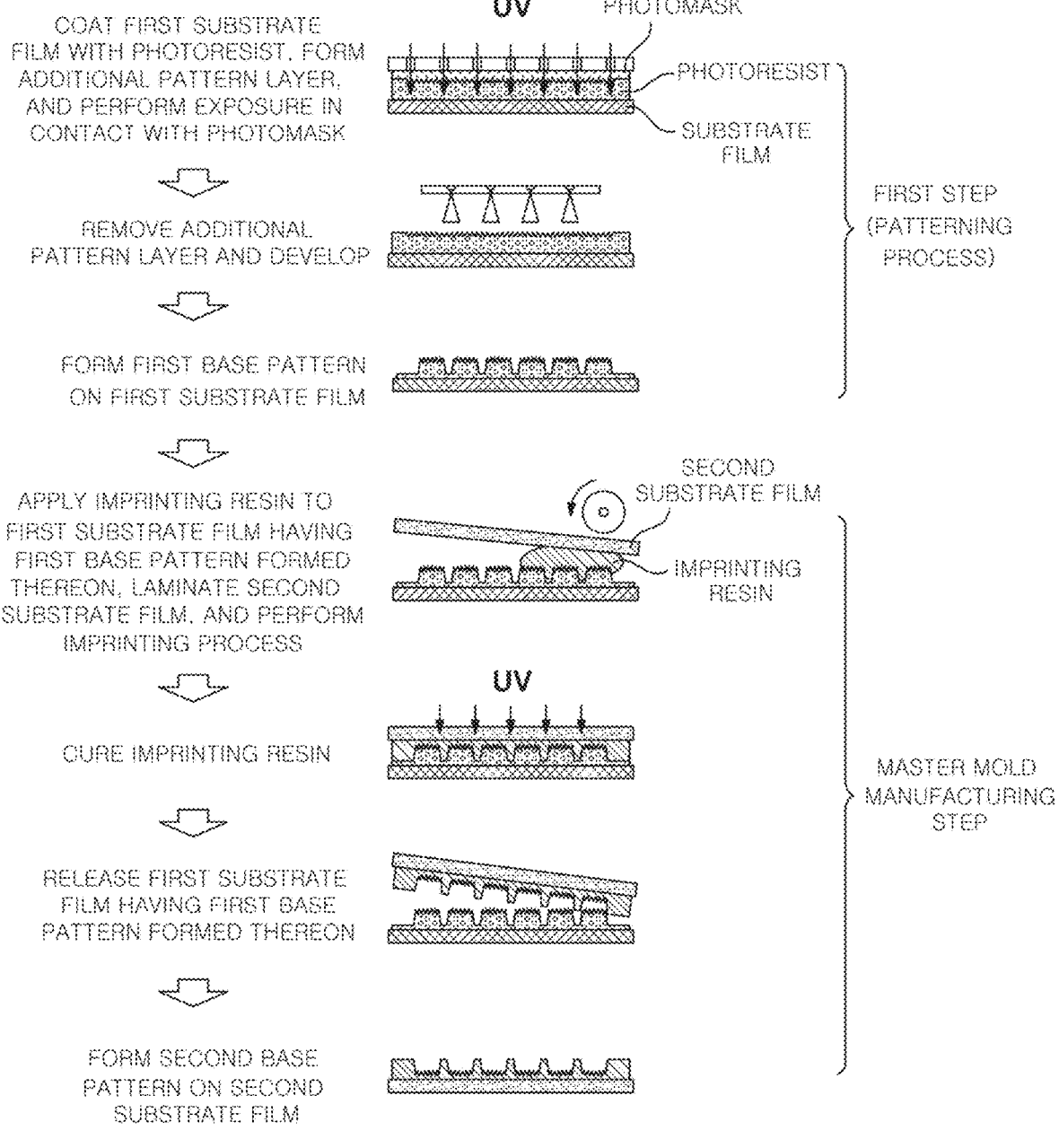
Figure 9B:
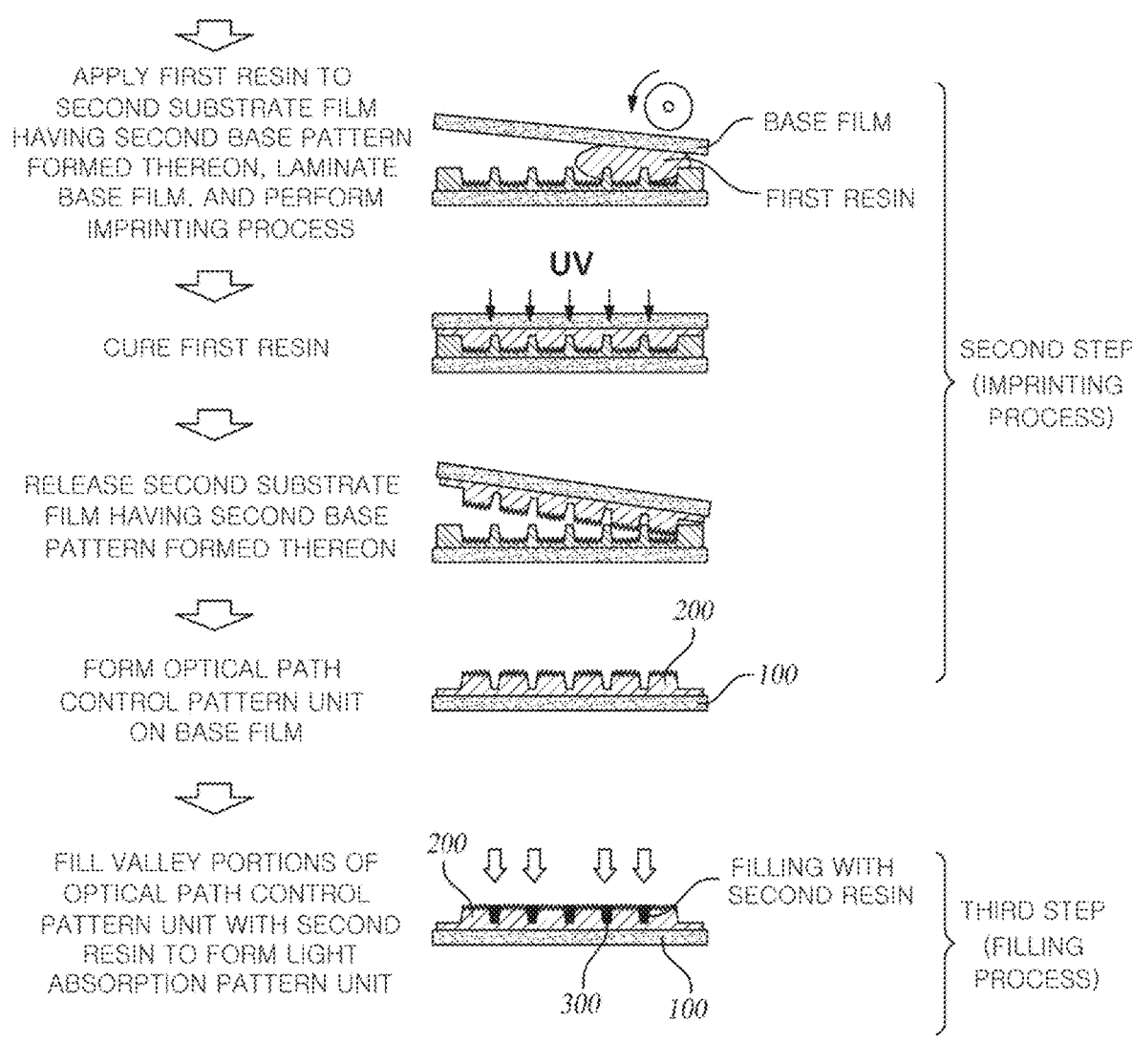
Figure 11A:
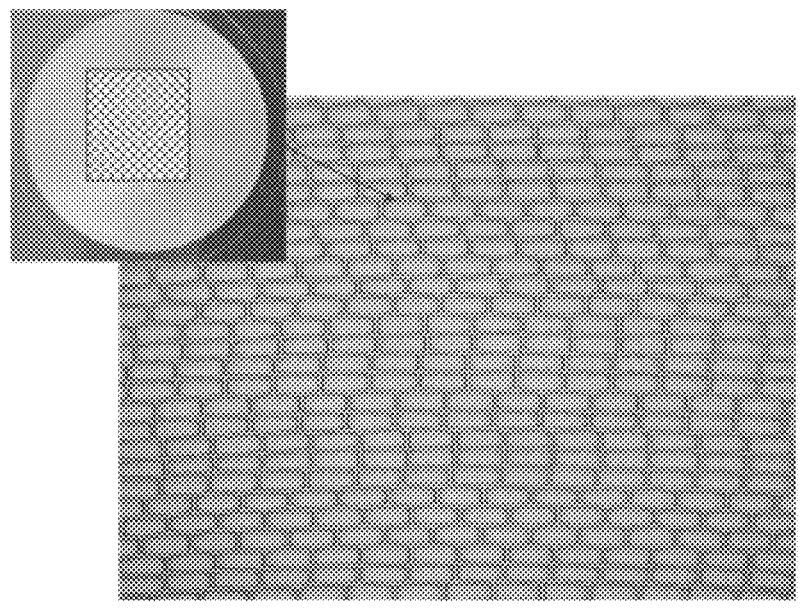
FIG. 11A shows an image of an optical film according to an embodiment of the present invention before the formation of a light absorption pattern unit.
Figure 11B:
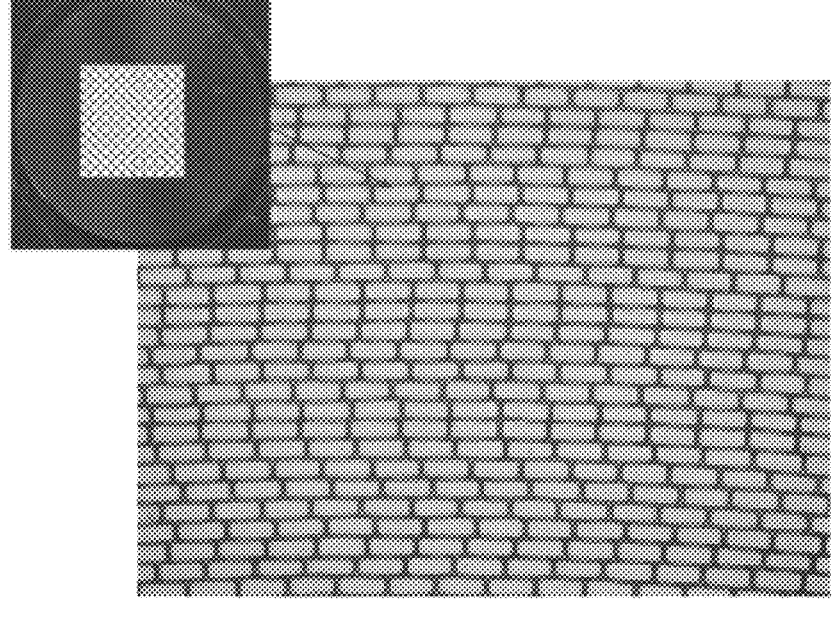
FIG. 11B shows an image of the optical film according to an embodiment of the present invention after the formation of the light absorption pattern unit.

Hereinafter, the present invention will be described in detail with reference to the accompanying drawings. FIGS. 1 to 6 are schematic views of optical films according to various embodiments of the present invention, FIG. 7A shows specifications of optical path control pattern units and light absorption pattern units according to various embodiments of the present invention, FIG. 7B shows data about transmittances based on the specifications, and FIG. 7C shows shielding angles based on the specifications, FIGS. 8, 9A, and 9B are schematic views showing a manufacturing method according to an embodiment of the present invention, FIGS. 10A, 10B, and 10C show product images in respective steps of the manufacturing method according to the embodiment of the present invention, and wherein FIG. 10A shows the base pattern formed on the substrate film through the patterning process of the first step, FIG. 10B shows the optical path control pattern unit formed on the base film through the imprinting process of the second step, and FIG. 10C shows the light absorption pattern unit realized as the result of the valley portions of the optical path control pattern unit being filled with the second resin in the third step. FIG. 11A shows an image of an optical film according to an embodiment of the present invention before the formation of a light absorption pattern unit. FIG. 11B shows an image of the optical film according to an embodiment of the present invention after the formation of the light absorption pattern unit.

As shown in FIGS. 1 to 6, the optical film for optical path control according to the present invention includes a base film 100, an optical path control pattern unit 200 formed on the base film 100, the optical path control pattern unit having a first refractive index, and a light absorption pattern unit 300 formed on the base film 100, the light absorption pattern unit having a second refractive index, which is less than the first refractive index.

As shown, the optical film according to the present invention is divided into a light transmission region defined as the optical path control pattern unit 200 and a shielding region defined as the light absorption pattern unit.

The base film 100 is preferably formed of a transparent substrate with high transmittance, and a rigid or flexible organic or inorganic substrate, such as glass, silicone, acrylic, polyethylene terephthalate, polycarbonate, polypropylene, polyethylene, polystyrene, or polymethylmethacrylate, may be selected and used depending on the process environment or application. In an embodiment of the present invention, polyethylene terephthalate (PET) is used due to low cost, high transparency, and excellent durability thereof.

The optical path control pattern unit 200 and the light absorption pattern unit 300, which have different refractive indices, are formed on the base film 100.

The optical path control pattern unit 200 has the first refractive index, and the light absorption pattern unit 300 has the second refractive index, which is less than the first refractive index, such that, due to the difference in refractive index between the optical path control pattern unit 200 and the light absorption pattern unit 300, information light is incident on a light receiving unit through the optical path control pattern unit 200, miscellaneous light from the outside, light reflected from an internal element or structure, etc. other than the information light is sufficiently absorbed through the light absorption pattern unit 300, whereby the information light is supplied to the light receiving unit with high accuracy and efficiency.

In the optical film according to the present invention, the light receiving unit is disposed on a path along which information light moves such that the light receiving unit can efficiently absorb information-reflected light (information light) after light generated by a light emitting unit is absorbed or reflected by an object to be sensed.

Figure 6:
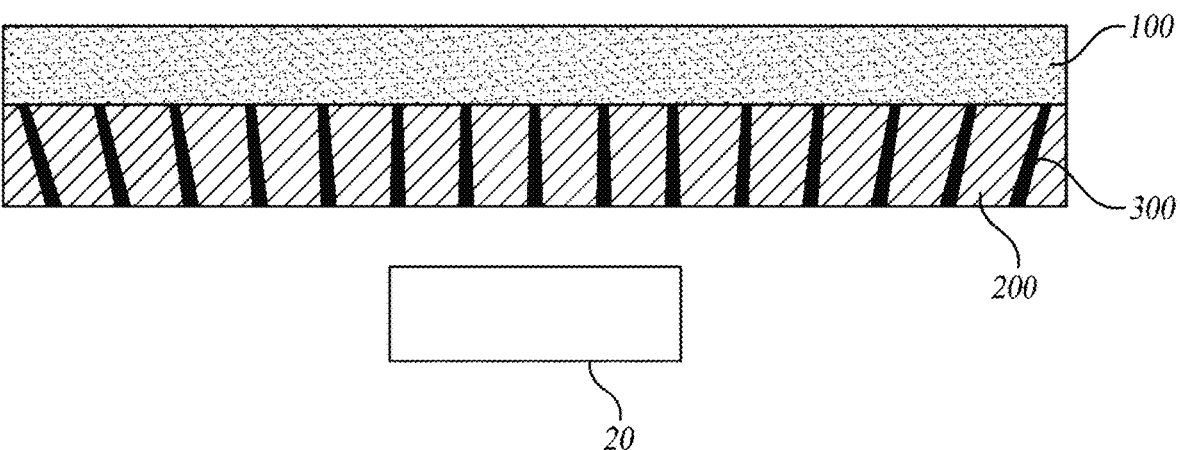

In a preferred embodiment of the present invention, as shown in FIG. 6, the optical film according to the present invention is applied to an optical sensor including a light emitting unit (not shown) and a light receiving unit 20, wherein the optical film is disposed at one side of the light receiving unit 20 in order to control an optical path so as to be directed to the light receiving unit 20 side of the optical sensor. That is, the optical film according to the present invention is disposed on a path along which information light having information acquired from an object moves such that the information light is efficiently supplied to the light receiving unit 20.

In the optical sensor, the light emitting unit may be an LED and the light receiving unit may be a photodiode, and the optical sensor may be applied to a touch panel of an electronic device, such as a smart terminal, a mobile phone, a monitor, or a TV, or may be applied to an electronic device having a wearable function configured to detect blood flow, components in blood, fat, and other characteristics by applying a specific wavelength of light to a living body and measuring the light that has passed through a body part.

In an embodiment of the present invention, patterns constituting the optical path control pattern unit 200 and the light absorption pattern unit 300 may be alternately formed.

That is, patterns made of two materials having different refractive indices are alternately formed, and the first refractive index of the optical path control pattern unit 200 is formed so as to be greater than the second refractive index of the light absorption pattern unit 300 such that light incident on the optical path control pattern unit 200 perpendicularly thereto or at a constant angle thereto is totally reflected at the interface between the optical path control pattern unit 200 and the light absorption pattern unit 300, whereby information light efficiently exits to the optical path control pattern unit 200.

Efficient exit of the information light is achieved such that the information light reaches the light receiving unit, through the size design of the optical path control pattern unit 200, the size design of the light absorption pattern part 300, the pitch design, the shape design, and the refractive index design of each thereof.

The light absorption pattern unit 300 absorbs miscellaneous light from the outside, light reflected from an internal element or structure, etc. other than the information light to shield the internal structure, thereby supplementing an aesthetic function, while minimizing measurement errors in the light receiving unit.

In addition, the patterns of the optical path control pattern unit 200 and the light absorption pattern unit 300 constituting the present invention may be alternately regularly disposed as described above, or may be disposed in a randomly arranged cell or linear structure depending on the purpose of use.

Figure 3:
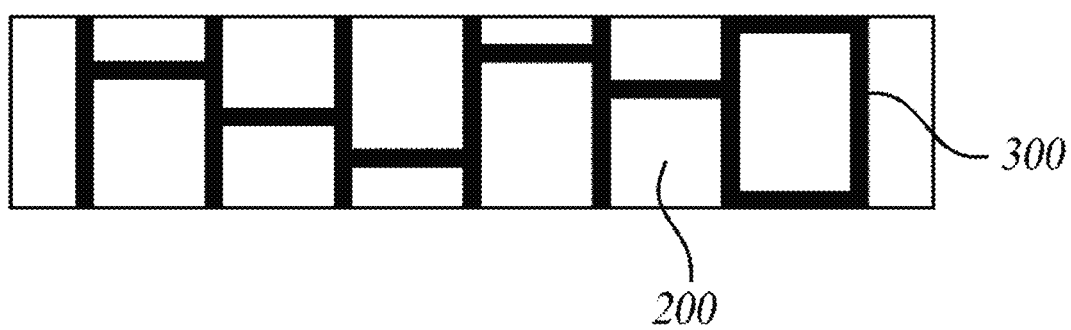

FIG. 3 is a schematic view showing the planar shape of an optical film according to an embodiment of the present invention, wherein a two-dimensional array structure of various shapes is shown.

In the embodiment of the present invention, the optical path control pattern unit 200 is characterized in that the width of the pattern on the light exit side is formed so as to be less than the width of the pattern on the light incidence side in order to increase efficiency of exit to the light receiving unit. That is, as shown in FIGS. 1 to 6, the width of the pattern on the light exit side is formed so as to be narrower such that efficient supply of information light to the light receiving unit is achieved without loss of the information light.

Specifically, the inclination of a pattern sidewall of the optical path control pattern unit 200 is 1° to 30° with respect to a vertical direction of the optical film. If the angle is less than the above range, the incident light forming total reflection may be limited, and if the angle is greater than the above range, the number of internal reflections may be increased, whereby light intensity may be reduced, resulting in information errors in the information light.

In addition, the pitch of the light absorption pattern unit 300 is preferably 10 to 100 μm, the width of the light absorption pattern unit 300 is preferably 2 to 10 μm, and the height of the optical path control pattern unit 200 is preferably 10 to 100 μm.

That is, the angle of information light to be transmitted through the optical path control pattern unit 200 is adjustable through size design of the optical path control pattern unit 200, the size design of the light absorption pattern unit 300, the pitch design, and the shape design of each thereof, such as the pitch of the light absorption pattern unit 300 (the width of the optical path control pattern unit 200), the width of the light absorption pattern unit 300, and the height of the optical path control pattern unit 200, whereby efficient incidence and exit of the information light are achieved such that the information light finally reaches the light receiving unit.

Here, it is advantageous that the width of the light absorption pattern unit 300 is not too wide in order to minimize a decrease in transmittance of the information light.

Furthermore, if the height of each of the optical path control pattern unit 200 and the light absorption pattern unit is too large, it is not easy to manufacture a base pattern and to imprint the optical path control pattern unit 200 and the light absorption pattern unit, and when the height of a resin that forms each of the optical path control pattern unit 200 and the light absorption pattern unit is not large, it is possible to minimize the extent to which a product is contracted and bent due to resin shrinkage.

Particularly, in the case of the resin that forms the light absorption pattern unit, the internal curing rate may decrease when curing with heat or light, such as UV curing, and therefore the height of each of the optical path control pattern unit 200 and the light absorption pattern unit (the thickness of the resin) must not be large, which is advantageous for curing.

In addition, since the height of each of the optical path control pattern unit 200 and the light absorption pattern unit is proportional to the amount of resin used, it is economical in terms of raw material use for the height of each pattern unit to not be larger than necessary.

In addition, if the width of the optical path control pattern unit 200 is greater than in the above embodiment, the tendency to distort from the design shape at the time of base pattern manufacture and imprinting processes during an exposure process increases, which is undesirable.

In addition, the minimum line width of the region of the light absorption pattern unit must be 2 μm or more to be practically manufactured due to the constraint on the resolution (to 2 μm) of a general chromium photomask, and it is necessary to maintain an appropriate width according to the above embodiment since the price of the photomask increases depending on the resolution and the light blocking rate of the resin decreases when the line width is reduced.

Furthermore, the difference between the first refractive index of the optical path control pattern unit 200 and the second refractive index of the light absorption pattern unit 300 is preferably 0.01 to 0.2. The refractive index may be designed in consideration of the angle of information light to be transmitted through the optical path control pattern unit 200. If the refractive index is less than the range, the range of the incident angle to satisfy the total reflection condition may be narrowed, and if the refractive index is greater than the range, the intensity of information light may be reduced due to total internal reflection.

Furthermore, it is preferable for the first refractive index of the optical path control pattern unit 200 to be increased with an increase in distance from the light receiving unit or for the inclination of the pattern sidewall of the optical path control pattern unit 200 to be decreased with an increase in distance from the light receiving unit, as shown in FIG. 6.

Here, it is preferable for the inclination of the pattern sidewall of the optical path control pattern unit 200 to be configured such that the inclination of the sidewall of each individual pattern distant from the light receiving unit is less than the inclination of the sidewall of each individual pattern close to the light receiving unit.

The reason for this is that it is possible to minimize the loss of information light that has passed through the optical path control pattern unit 200, whereby it is possible to provide information light having accurate information to the light receiving unit.

Figure 1:
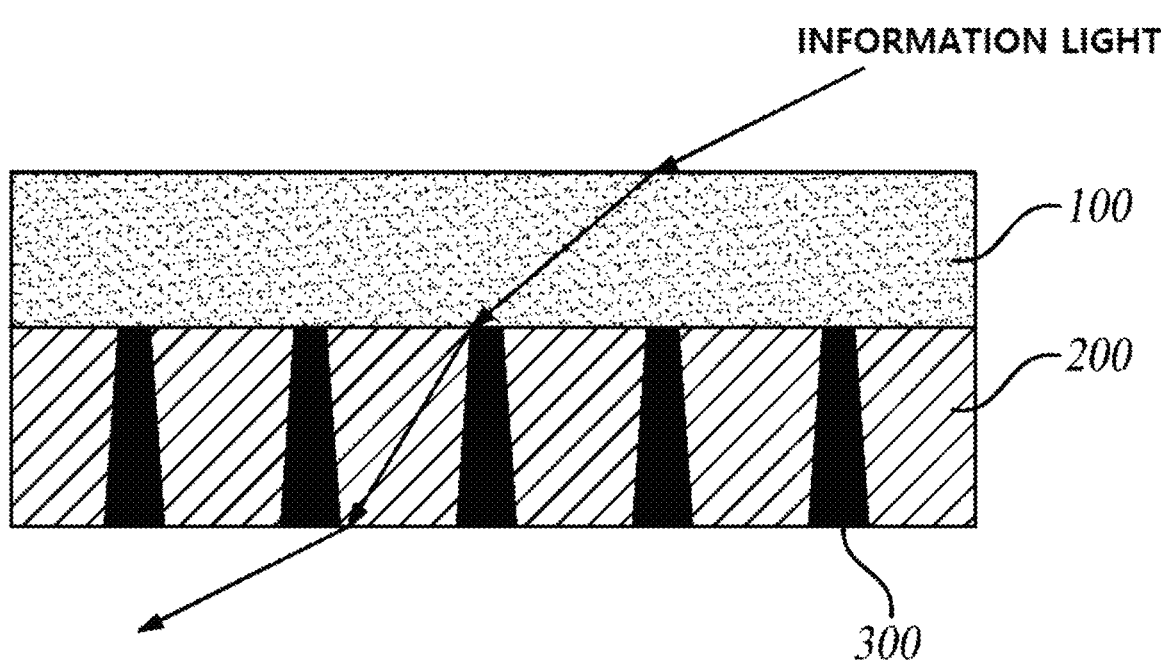
FIGS. 1 to 6 are schematic views of optical films according to various embodiments of the present invention (FIG. 3 is a schematic view showing the planar shape of an optical film according to an embodiment of the present invention).
Figure 2:
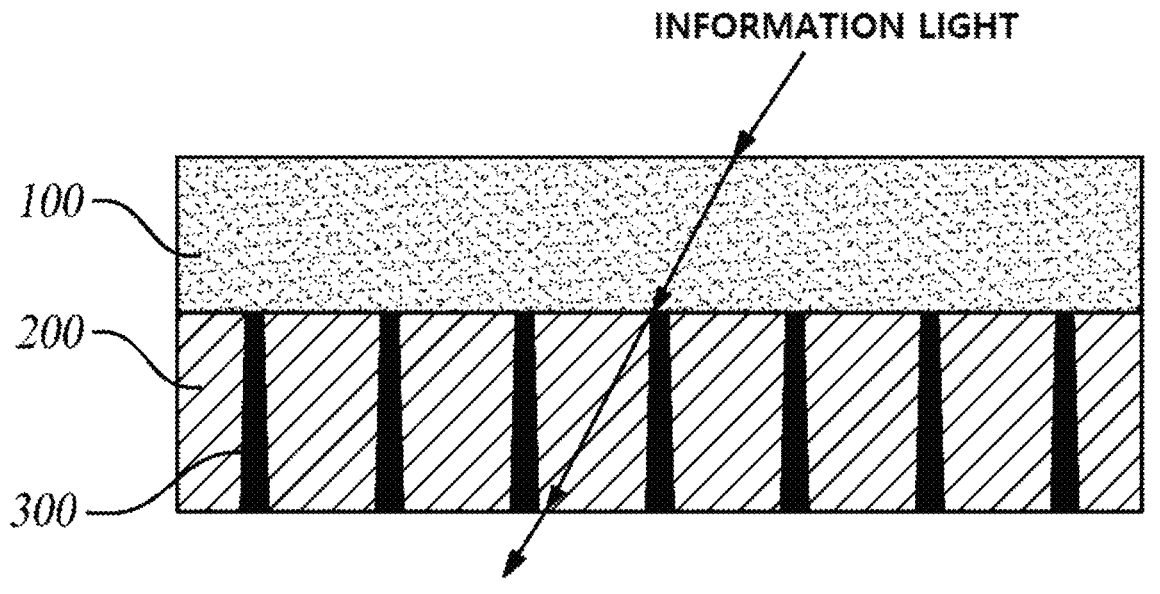

In addition, as shown in FIGS. 1 and 2, each of the optical path control pattern unit 200 and the light absorption pattern unit 300 according to the embodiment of the present invention is configured such that the width of the pattern on the light exit side is formed so as to be less than the width of the pattern on the light incidence side and each pattern unit has a polygonal longitudinal-sectional shape. Furthermore, the surface of each of the optical path control pattern unit 200 and the light absorption pattern unit 300 on the light exit side is formed flat.

FIG. 1 shows the case in which the angle of information light to be transmitted through the optical path control pattern unit 200 is less than in FIG. 2, wherein FIG. 1 is characterized by a less height of the optical path control pattern unit 200, a greater inclination of the sidewall of the pattern of the optical path control pattern unit 200, and a greater width of the light absorption pattern unit 300 than FIG. 2.

As such, the width, height, and inclination of the pattern are designed based on the angle of incident information light such that the information light is efficiently incident on the light receiving unit.

Figure 4:
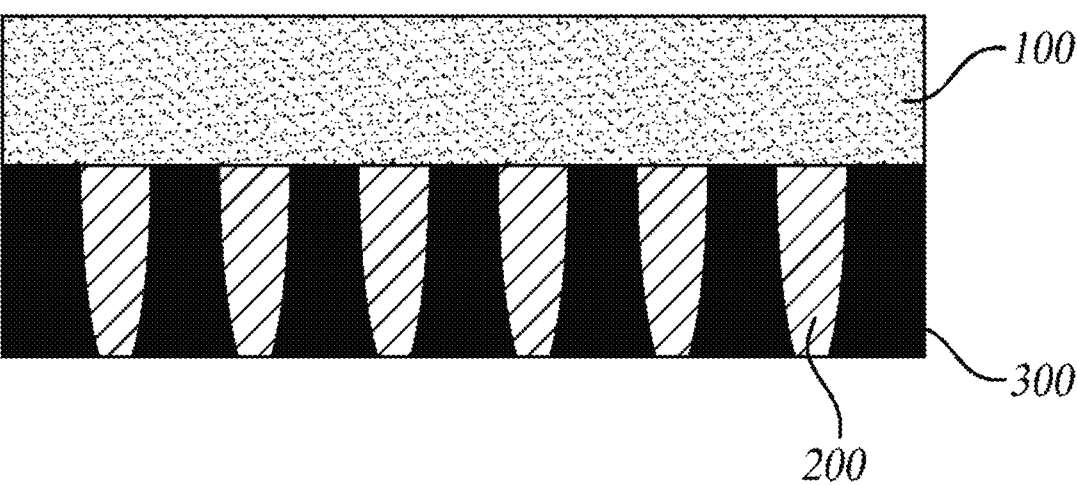

Furthermore, in another embodiment of the present invention, as shown in FIG. 4, each of the optical path control pattern unit 200 and the light absorption pattern unit 300 is configured such that the width of the pattern on the light exit side is formed so as to be less than the width of the pattern on the light incidence side and each pattern unit has a parabolic longitudinal-sectional shape. Furthermore, the surface of each of the optical path control pattern unit 200 and the light absorption pattern unit 300 on the light exit side is formed flat.

Figure 5:
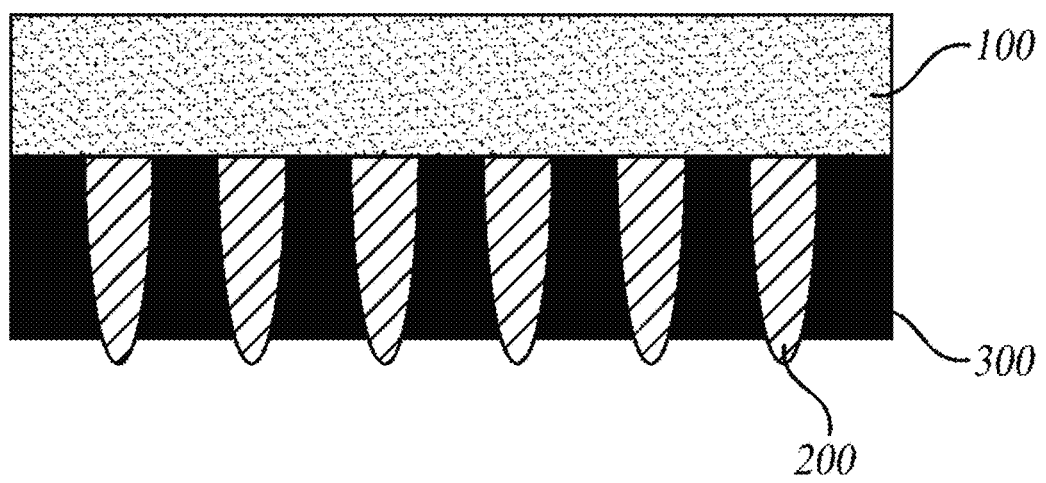

Furthermore, in another embodiment of the present invention, as shown in FIG. 5, each of the optical path control pattern unit 200 and the light absorption pattern unit 300 is configured such that the width of the pattern on the light exit side is formed so as to be less than the width of the pattern on the light incidence side, each pattern unit has a parabolic longitudinal-sectional shape, and the surface of the optical path control pattern unit 200 on the light exit side is formed so as to protrude farther than the surface of the light absorption pattern unit 300 on the light exit side.

Here, the protruding height of the surface of the optical path control pattern unit 200 on the light exit side is greater by about 0.1 to 3 μm than the height of the surface of the light absorption pattern unit 300 on the light exit side, and this means the protruding height of the center of the pattern when the pattern of the optical path control pattern unit 200 is parabolic.

As such, each of the optical path control pattern unit 200 and the light absorption pattern unit 300 according to the present invention may be implemented in various forms depending on the structure of the optical sensor including the light emitting unit and the light receiving unit, the type of information light, the angle of incident information light, etc., and these various embodiments are intended to ensure that information light having accurate information is efficiently incident on the light receiving unit without loss of the information light.

In the case of the optical path control pattern unit 200 having the parabolic shape, or in the case of the optical path control pattern unit 200 configured such that the surface of the optical path control pattern unit on the light exit side protrudes, the range of incident light in which total reflection can be achieved becomes wider and the area of the light absorption pattern unit 300 on the light exit side becomes larger, whereby the shielding property of the internal structure, etc. is improved.

As such, in the present invention, the patterns constituting the light absorption pattern unit 300 are formed between the patterns constituting the optical path control pattern unit 200 such that the incident path of information light to the light receiving unit is efficiently controlled based on the difference in refractive index between the optical path control pattern unit 200 and the light absorption pattern unit and miscellaneous light is blocked by the light absorption pattern unit, whereby information light having more accurate information about the object is incident on the light receiving unit.

In addition, the optical film according to the present invention has the optical path control pattern unit 200 and the light absorption pattern unit disposed between the patterns thereof, whereby it is possible to provide an optical film having an overall flat shape, and therefore it is possible to minimize the occurrence of defects during assembly and processing compared to an outwardly exposed shape of a conventional optical pattern while easily handling the optical film.

In addition, the patterns of the optical path control pattern unit 200 and the light absorption pattern unit 300 constituting the present invention may be alternately regularly disposed as described above, or may be disposed in a randomly arranged cell or linear structure depending on the purpose of use.

As shown in FIG. 3, the planar shape of the optical film may represent a two-dimensional array structure of various shapes, and the patterns in different columns may be randomly arranged, or the pattern specifications (e.g. the width and the pitch) may be varied.

FIG. 7A shows specifications of optical path control pattern units and light absorption pattern units according to various embodiments of the present invention. FIG. 7B shows transmittance for each pattern pitch and FIG. 7C shows shielding angle for each aspect ratio (AR).

The specifications of each of the optical path control pattern unit and the light absorption pattern unit, such as the pitch, the height, the width, and the refractive index, are appropriately designed based on the structure, specifications, etc. of a product in order to efficiently control the incident path of information light to the light receiving unit, and miscellaneous light is blocked by the light absorption pattern unit, whereby information light having more accurate information about the object is incident on the light receiving unit.

Meanwhile, FIG. 8 shows a manufacturing method according to one embodiment of manufacturing the optical film according to the present invention, wherein the manufacturing method includes a first step of forming a base pattern made of a first resin on a substrate film through a patterning process, a second step of applying a first resin to the substrate film having the base pattern formed thereon, laminating a base film, and performing an imprinting process to form an optical path control pattern unit made of the first resin and having a first refractive index on the base film, and a third step of filling valley portions of patterns constituting the optical path control pattern unit with a second resin to form a light absorption pattern unit having a second refractive index, which is less than the first refractive index, on the base film together with the optical path control pattern unit.

As shown in FIG. 8, in the manufacturing method of the optical film according to the present invention, first, a base pattern made of a first resin is formed on a substrate film through a patterning process.

The substrate film is made of a transparent or opaque material depending on the type of a photoresist used in the patterning process, and any one of polyethylene terephthalate, acrylic, polystyrene, and polymethylmethacrylate is used.

After coating the substrate film with a photoresist, a patterning process based on exposure and development is performed in the state in which a photomask is in contact with one surface of the substrate film to form a base pattern on the substrate film.

The base pattern is the inverse of patterns constituting the optical path control pattern unit according to the present invention, and is formed in response to the design value of the optical path control pattern unit.

Subsequently, a first resin is applied to the substrate film having the base pattern formed thereon, a base film is laminated, an imprinting process (roll pressing→curing) is performed, and the substrate film having the base pattern formed thereon is released to form an optical path control pattern unit made of the first resin and having a first refractive index on the base film.

Valley portions of the patterns constituting the optical path control pattern unit are filled with a second resin to form a light absorption pattern unit having a second refractive index, which is less than the first refractive index, on the base film together with the optical path control pattern unit.

Here, the optical path control pattern unit may be configured such that two or more patterns having different shapes are formed in combination in a specific region of the base film.

This may be implemented by manufacturing a master mold in which a composite base pattern is implemented using molds having different base patterns formed thereon, forming an optical path control pattern unit constituted by composite patterns in different regions on the base film through the imprinting process of the second step and the filling process of the third step, and forming a light absorption pattern unit in valley portions of the optical path control pattern unit in a specific region.

Meanwhile, each of the first resin and the second resin is a material that is cured by heat or light after the imprinting process, such as radiation-curable epoxy acrylate, urethane acrylate, polyester acrylate, or a substitute agent having an adjusted refractive index. In addition, SU-6, SU-7, a fluorine-based acrylic resin, a resin including a fluorine functional group, or an acrylic resin having an aromatic functional group may be used. Here, different types of resins may be used as the first resin and the second resin such that there is a difference in refractive index therebetween.

That is, a high refractive index resin that has a higher refractive index after curing may be used as the first resin, and a low refractive index resin that has a lower refractive index after curing may be selected as the second resin. Even though a resin is not a high refractive index resin, refractive index particles may be included in the resin in order to implement a high refractive index resin.

For example, a high refractive index resin may be formed by dispersing high refractive index particles in an acrylic resin having an aromatic functional group, and a low refractive index resin may be a fluorine-based acrylic resin or a resin including a fluorine functional group. Of course, high refractive index particles may be included in a low refractive index resin in order to form a high refractive index resin.

Inorganic nanoparticles, such as a material including at least one of titanium oxide, tin oxide, zirconia, zinc oxide, magnesium oxide, barium titanate, alumina, and silica, may be used as the high refractive index particles.

The inorganic nanoparticles may have a diameter of 1 to 50 nm, and may be added in the state in which the surface of each of the inorganic nanoparticles is modified in order to improve dispersibility in a resin. Modification of the surface of each of the inorganic nanoparticles may be performed using any of known methods. For example, the surface of each of the nanoparticles may be coated with a polymer, or a dispersant, a surfactant, etc. may be added.

The manufacturing method according to the present invention may be implemented through a roll-to-roll imprinting process when the substrate film having the base pattern formed thereon is used as a master mold and a flexible base film is applied thereto. When the manufacturing method according to the present invention is used, mass production is possible, whereby it is possible to reduce unit cost of production.

FIGS. 9A and 9B show a manufacturing method of an optical path control film according to another embodiment of the present invention, wherein the optical path control film is manufactured using a master mold. In particular, a micro-pattern is formed in the optical path control pattern unit in order to reduce surface reflection and to improve the transmission performance of incident light.

First, in a patterning process, an additional pattern layer may be inserted. That is, a first substrate film may be coated with a photoresist, and then an additional pattern layer may be formed. Subsequently, a patterning process based on exposure and development is performed in the state in which a photomask is in contact with one surface of the first substrate film to form a first base pattern on the first substrate film.

Here, the additional pattern layer is formed of a transparent material that is capable of forming an additional pattern on the surface of the photoresist while being releasable from the photoresist, whereby an additional pattern may be formed on the surface of the photoresist.

FIG. 9A shows that a finely shaped additional pattern is formed on the surface of the photoresist by the additional pattern layer, wherein an additional pattern duplicated by the additional pattern layer is formed on the upper side (ridge portions) of the first base pattern formed on the first substrate film.

In a master mold manufacturing step, an imprinting resin is applied to the first substrate film having the first base pattern formed thereon, a second substrate film is laminated, an imprinting process is performed, and the first substrate film having the first base pattern formed thereon is released to form a second base pattern on the second substrate film. This is used as a master mold, and when the second substrate film is made of a flexible material, an optical path control pattern unit may be continuously mass-produced through a roll-to-roll process in a subsequent step.

Here, the second base pattern used as the master mold is the inverse of an optical path control pattern unit according to the present invention, and since the additional pattern is formed on the ridge portions of the first base pattern, an additional pattern is formed in valley portions of the second base pattern.

Subsequently, as shown in FIG. 9B, a first resin is applied to the second substrate film having the second base pattern formed thereon, a base film is laminated, an imprinting process is performed, and the second substrate film having the second base pattern formed thereon is released to form an optical path control pattern unit on the base film.

That is, the optical path control pattern unit is formed on the base film using the second substrate film having the second base pattern formed thereon as the master mold.

Here, an additional pattern is implemented on ridge portions of the optical path control pattern unit by the additional pattern formed in the valley portions of the second base pattern. As a result, surface reflection is reduced, whereby the transmission performance of incident light is improved, as described above.

The additional pattern may be regularly or randomly formed. In an embodiment of the present invention, a fine additional pattern, such as a moth eye, may be formed as the additional pattern.

Subsequently, valley portions of the optical path control pattern unit are filled with a second resin to form a light absorption pattern unit, in the same manner as described above.

FIGS. 10A, 10B, and 10C show product images in respective steps of the manufacturing method according to the embodiment of the present invention, wherein FIG. 10A shows the base pattern formed on the substrate film through the patterning process of the first step, FIG. 10B shows the optical path control pattern unit formed on the base film through the imprinting process of the second step, and FIG. 10C shows the light absorption pattern unit realized as the result of the valley portions of the optical path control pattern unit being filled with the second resin in the third step.

FIG. 11A shows an image of an optical film according to an embodiment of the present invention before filling with a resin (second resin) to form a light absorption pattern unit and FIG. 11B shows an image of the optical film according to an embodiment of the present invention after filling with a resin (second resin) to form a light absorption pattern unit, wherein the optical film is manufactured so as to have a two-dimensional array structure.

In the optical film for optical path control manufactured according to the manufacturing method of the present invention, as described above, the incident path of information light to the light receiving unit is efficiently controlled based on the difference in refractive index between the optical path control pattern unit and the light absorption pattern unit, and miscellaneous light is blocked by the light absorption pattern unit, whereby information light having more accurate information about the object is incident on the light receiving unit.

The invention claimed is:

1. An optical film for optical path control, the optical film comprising:
a base film;
an optical path control pattern unit formed on the base film, the optical path control pattern unit having a first refractive index; and
a light absorption pattern unit formed on the base film, the light absorption pattern unit having a second refractive index less than the first refractive index,
wherein the optical film controls an optical path such that light is incident on a light receiving unit of an optical sensor, and wherein the optical film is configured such that the first refractive index of the optical path control pattern unit is increased with an increase in distance from the light receiving unit.

2. The optical film according to claim 1, wherein the optical film is configured such that an inclination of a pattern sidewall of the optical path control pattern unit is decreased with an increase in distance from the light receiving unit.

3. The optical film according to claim 2,
wherein the inclination of the pattern sidewall of the optical path control pattern unit is configured such that an inclination of a sidewall of each individual pattern distant from the light receiving unit is less than an inclination of a sidewall of each individual pattern close to the light receiving unit.

4. The optical film according to claim 1, wherein patterns constituting the optical path control pattern unit and the light absorption pattern unit are alternately formed.

5. The optical film according to claim 1, wherein an additional pattern is formed on a ridge portion of the optical path control pattern unit.

6. The optical film according to claim 1, wherein a difference between the first refractive index and the second refractive index is 0.01 to 0.2.

7. The optical film according to claim 1, wherein patterns constituting the optical path control pattern unit and the light absorption pattern unit are regularly disposed or are disposed in a randomly arranged cell or linear structure.

8. The optical film according to claim 1, wherein the optical path control pattern unit is configured such that a width of a pattern on a light exit side is less than a width of the pattern on a light incidence side.

9. The optical film according to claim 8, wherein a pattern of the optical path control pattern unit has a polygonal or parabolic longitudinal-sectional shape.

10. The optical film according to claim 9, wherein a surface of each of the optical path control pattern unit and the light absorption pattern unit on the light exit side is formed flat.

11. The optical film according to claim 9,
wherein the optical path control pattern unit and the light absorption pattern unit are configured such that a surface of the optical path control pattern unit on the light exit side is formed so as to protrude farther than a surface of the light absorption pattern unit on the light exit side.

12. The optical film according to claim 11, wherein a protruding height of the surface of the optical path control pattern unit on the light exit side is greater by 0.1 to 3 μm than a height of the surface of the light absorption pattern unit on the light exit side.

13. The optical film according to claim 8, wherein an inclination of a pattern sidewall of the optical path control pattern unit is 1° to 30° with respect to a vertical direction of the optical film.

14. The optical film according to claim 8, wherein a pitch of the light absorption pattern unit is 10 to 100 μm.

15. The optical film according to claim 8, wherein a width of the light absorption pattern unit is 2 to 10 μm.

16. The optical film according to claim 8, wherein a height of the optical path control pattern unit is 10 to 100 μm.

* * * * *